United States Patent [19]
Dixon

[11] Patent Number: 5,314,337
[45] Date of Patent: May 24, 1994

[54] COLOR-CODED DATA INPUT SYSTEM METHOD AND APPARATUS

[76] Inventor: Peter O. Dixon, P.O. Box 5653, Carefree, Ariz. 85377

[21] Appl. No.: 951,139

[22] Filed: Sep. 25, 1992

[51] Int. Cl.$^5$ ............................................. G09B 19/00
[52] U.S. Cl. ...................................... 434/227; 434/233
[58] Field of Search ......................... 434/159, 227, 233

[56] References Cited

U.S. PATENT DOCUMENTS

| | | |
|---|---|---|
| 1,527,100 | 2/1925 | Williams ............................ 434/227 |
| 1,584,627 | 5/1926 | Marino ............................... 434/159 |
| 1,823,130 | 9/1931 | Smith .............................. 434/227 X |
| 2,053,874 | 9/1936 | O'Donnell ........................... 434/227 |
| 2,802,284 | 8/1958 | Dreisconstock et al. .......... 434/227 |
| 4,580,984 | 4/1986 | Madaus ............................... 434/227 |

FOREIGN PATENT DOCUMENTS

46001  7/1932  Denmark ............................ 434/233

Primary Examiner—Gene Mancene
Assistant Examiner—L. Thomas
Attorney, Agent, or Firm—Rosenbaum & Schwartz

[57] ABSTRACT

A color-coded method and apparatus of learning to type is disclosed having three sets of flash cards which teach the location of keyboard symbols and the appropriate finger to employ a given symbol by the use of a predetermined sector-color-coded keyboard. The invention also includes adhesive backed colored appliques matching the sector-color-coding which can be removably applied to the fingers or another support to provide a means for initial learning of the method prior to practicing the method. Finally, the keyboard is covered with the color appliques according to the predetermined sector color code and a look-away image of the predetermined sector-color-coded keyboard is provided to prevent the user from looking at the keyboard while typing. This system can also be applied to other multiple finger actuated input devices.

23 Claims, 5 Drawing Sheets

COLOR-CODED DATA INPUT SYSTEM METHOD AND APPARATUS

BACKGROUND OF THE INVENTION

1. Fields of the Invention

The present invention relates generally to an apparatus and method of learning or teaching operations, such as typing, and, more particularly, to operations based on a color-coded data input device, such as a typing keyboard, divided into sectors by color and aided by sets of color-coded flash cards, finger appliques and a "look-away" image of the color-coded data input device.

2. Discussion of Background and Prior Art

There is a long felt need for an easy way to learn to type.

Sectorized keyboards with finger applied aids have been known for almost 100 years since the invention of the typewriter. The earliest device used key-coded finger rings bearing letters of the keyboard divided into groups based on convenience and finger dexterity. These devices gave birth to a variety of gadgets mounted on top of the user's hands. These devices provided a variety of finger-key correlations by group and finger-home position correlations and were designed to provide an unobstructed view of the keyboard encouraging students to look toward their hands and hence the keyboard as they learned to type.

Sector-color-coded touch type keyboards have also been known for almost 100 years. It was early recognized that it was helpful to blank out the keyboard with opaque discs in alternate sets of distinctly, differently colored columns, coupled with the use of a discardable, matching, color-coded index or letter plate which facilitated initial learning of typing. Despite this early teaching, it has not proven successful. Typing to this day remains a difficult task to learn.

In the early 1960's still other methods of teaching touch typing were introduced including a system whereby the keyboard remained locked until it was unlocked by the student touching the correct key, or electrical contraptions which vibrated the student's fingers as an instructor typed on a master and lighted a central display. Of course, these systems also failed to achieve wide acceptance.

With the advent of widespread use of computer keyboards in the late 1960's, Mildred Olsen invented a system described in U.S. Pat. No. 3,501,849 utilizing a device for teaching typing and language skills to people culturally deprived of language development. Her system was based on use of a sector-color-coded keyboard blanked by opaque discs with matching colored finger rings and a chart, picture or instruction manual which presented colored circled letters or recognizable objects (i.e., a cat) with a direction arrow. By color and direction indications, the student would know which finger to move and where to move it to strike the appropriate key. While Olsen had the right idea, nevertheless, she did not unlock the key to learning typing easily because her system still encouraged looking at the hands and keys with the resultant use of hunt and peck technique. Her device has not been commercially successful.

So, too, the more recent software implemented, computer-aided methods of various types have only modestly advanced the art by reverting to updated earlier methods, such as, applying color-coded adhesive backed appliques to finger guides mounted on the user's hands in an effort to teach typing by sector-color-coded methods.

No one has recognized the problem is the tendency of typing novices to develop the unhealthy "hunt and peck" technique at the initial learning stage. It is disgraceful, for example, to observe students, in particular, pre-school aged children, having a computer keyboard thrust upon them and then watching them stare at the keyboard and hunt and peck as they search the keyboard to learn where the letters are located and which finger to use to strike the desired key. Once these bad typing habits are learned, they are very difficult to break.

Accordingly, today there is still a long felt need for an easy method to learn typing which effectively teaches color-symbol-finger-sector-key position correlations in a way that avoids the initial development of hard to break, bad, typing habits.

SUMMARY OF THE INVENTION

Set forth below is a brief summary of the invention which solves the forgoing problems and provides benefits and advantages in accordance with the purposes of the present invention as embodied and broadly described herein.

One aspect of the invention is a set of flash cards for use in learning operations on a sector-color-coded input device. The set contains one card for each symbol on the input device, and each card has on one side a symbol in a uniform set style and on the other side the same symbol in its assigned color according to the predetermined sector-color-code.

Probably the most common embodiment the operations being learned are touch typing and the input device is a conventional keyboard.

The learning system of the present invention has very broad applications and may be used for any multiple finger actuated input device, such as, the simple number pad, or even the multiple finger actuated joy stick controls on airborne fire control radar systems.

A second aspect of the invention is a set of adhesively backed appliques which include a first plurality of groups of individual, blank, opaque, adhesive backed appliques arranged in a sheet, each applique adapted to be removed from the sheet and adhered to the top of a key on the keyboard to cover the key symbol, there being as least one group of appliques for each sector and at least one individual applique for each key in each sector. The set has a second plurality of individual, blank, adhesive backed appliques which are adapted to be removably applied to the top of a finger of the user's hand, there being at least one individual applique for each finger of each hand. The appliques are each color-coded according to the predetermined sector-color-code of the keyboard.

A third aspect of the invention is a second set of flash cards in which each card has on one side a symbol in a uniform set style and on the other side an image of that half of a predetermined, sector-color-coded input device, for example, a typewriter or computer keyboard, which contains the symbol with all the keys blank other than the one bearing the symbol. A variation of this feature is a third set of cards which superimposes a line image of the operator's hand over the half-keyboard image, with the correct finger-symbol correlation.

A fourth aspect of the invention is a sector-color-coded data input device, such as a keyboard, in which the color code comprises the five colors orange, blue, yellow, red and green and in which the sector code comprises the columns of the keyboard colored from the numeral 1 column on the left to the numeral 0 column on the right in the order orange, blue, yellow, red, green, yellow, blue and orange. The two columns left of center, columns 4 and 5, are each red, and the two columns right of center, columns 6 and 7, are each green.

A final aspect of the invention is a "look-away" image of the sector-color-coded input device, i.e. keyboard, with key symbols visible.

Other features of the invention include the black lower case letter style as the uniform style for the keyboard flash cards and look-away image display, the identification of the letters "d" and "k", the home position for the center finger of each hand, by a roughed surface on the keyboard and appliques to identify them as tactile letters.

A further feature of the invention is a set of removable, self stick appliques having one sector-color-coded applique for each symbol of the input device, for example the keyboard, which may be removably adhered to a support, such as, a refrigerator door, for further reinforcing the letter-color correlation, especially in pre-school aged children.

The present invention enables the student to associate the predetermined sector-color-code for each symbol at the time he learns the alphabet as a pre-school student. Finger-sector-color position correlations are identified and reinforced through the finger dots and second set of flash cards. The opaque sector-color-coded keyboard and remote keyboard image with keys visible forces the student to "look-away" from the keyboard while learning to type. The hunt and peck habit is never learned and need never be unlearned. Learning typing becomes easy and enjoyable.

DETAILED DESCRIPTION OF THE PREFERRED EMBODIMENT

The invention is best utilized in the process which is described below.

Figure 6:
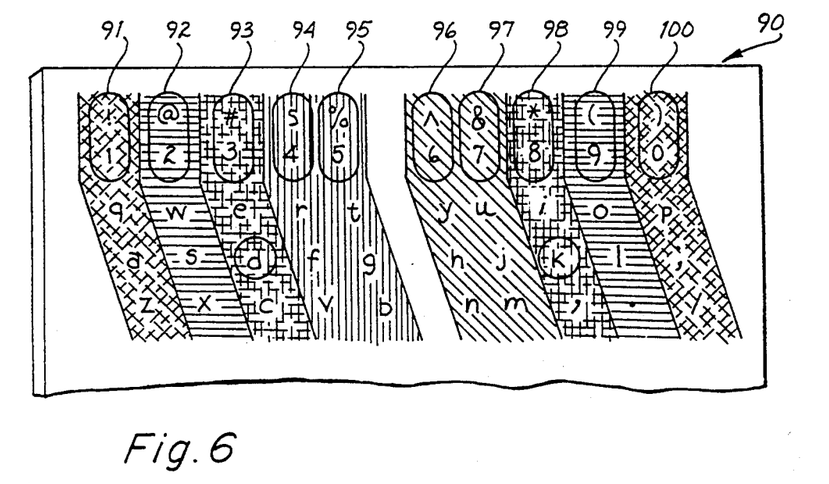
FIG. 6 is a plan view of a remote image display of the sector-color-coded keyboard of the present invention with the key symbols visible.

As is best seen in FIG. 6, the predetermined, color-code includes the five colors orange, blue, yellow, red and green. Only five colors are used for purposes of simplicity and ease of learning, especially as the invention is used by pre-school aged children. These five colors are each used twice beginning from the outboard columns of the keyboard inwardly to the center columns in order first with orange, then blue, then yellow, then two columns of red and two columns of green on each side of the center line.

As best shown in FIG. 6, the predetermined, sector-code utilizes the columns of the keyboard colored as follows:

| | |
|---|---|
| the numeral 1 column, 91: | orange |
| the numeral 2 column, 92: | blue |
| the numeral 3 column, 93: | yellow |
| the numeral 4 column, 94: | red |
| the numeral 5 column, 95: | red |
| the numeral 6 column, 96: | green |
| the numeral 7 column, 97: | green |
| the numeral 8 column, 98: | yellow |
| the numeral 9 column, 99: | blue |
| the numeral 0 column, 100: | orange. |

Figure 1:
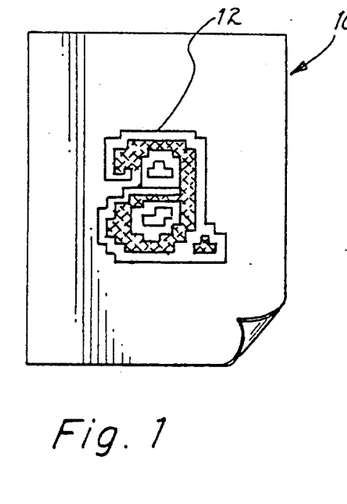
FIGS. 1A and 1B are elevation views of each side of the first set of flash cards.
Figure 1A:
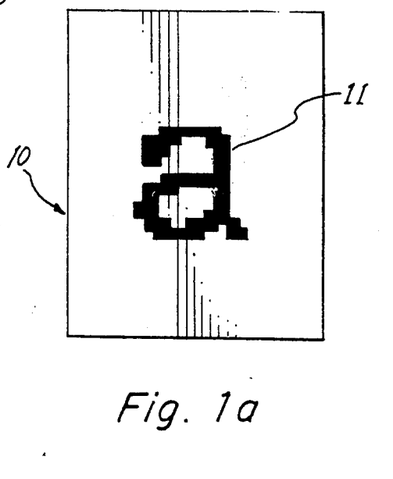

FIG. 1 shows one card 10 of the first set of flash cards. Each card has on one side a symbol 11 in a black lower case form which is uniform for the entire set. FIG. 1A shows the letter "a". On the other side of the card 10 appears the same symbol 12 in its assigned color (orange) according to the predetermined sector-color-code. The first card set teaches the student the symbol-color correlation of this typing method. In the case of pre-school children, the student learns this correlation at the same time that he learns the alphabet and the numbers.

To reinforce the rapid learning of the symbol-color correlation of the first set of flash cards, the present invention contemplates the use of a set of removable self-stick appliques on a backing sheet or a set of individual self stick or magnetic letters, each individual applique bearing or formed as one input letter/symbol on the input device, i.e. keyboard. The letter/symbols may be removably applied to a support, such as a wall or refrigerator door. These appliques are very effective in helping pre-school aged children learn the symbol-color correlations.

No typewriter, keyboard or computer is needed to learn these correlations. Thus, this card set, the symbol-color applique set, and the second and third sets described below as to FIGS. 3-4, 9-10 fulfill a primary object of the present invention which is to teach and learn the appropriate symbol-color-finger codes without the use of or subsequent dependency on seeing the keyboard.

Since a large majority of the letters typed are lower case, using lower case in the teaching method makes the transition from learning to read and write to typing easier. While black is the preferred form for the uniform form of the symbol on the one side, other colors may be used on this side. For example, it may be desired to print the lower case letter in its assigned color on both sides of the card.

Figure 2A:
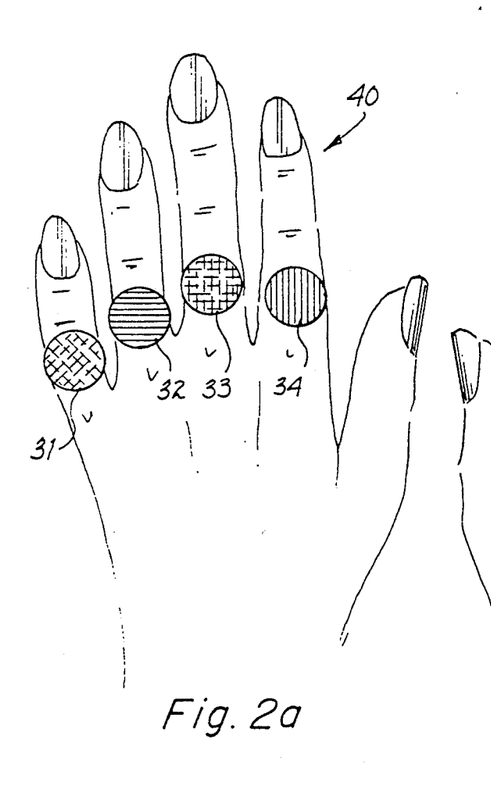
FIGS. 2A and 2B are plan views of the user's hands showing the sector-color-coded finger dots applied to the tops of the fingers.
Figure 2B:
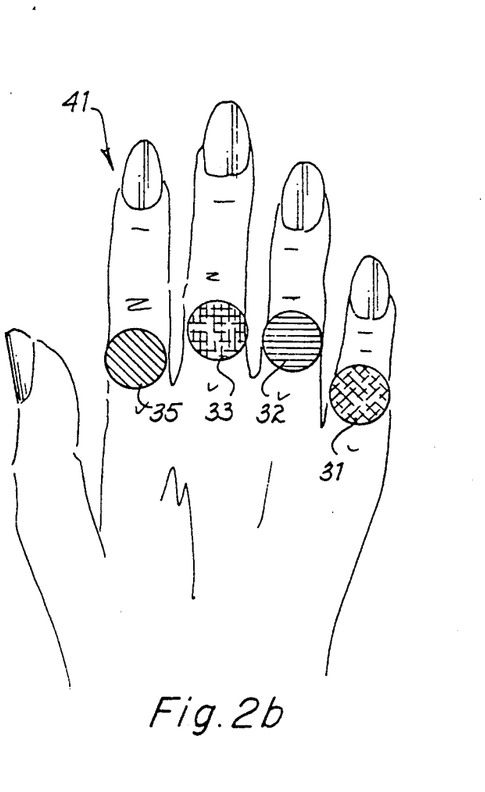
Figure 2C:
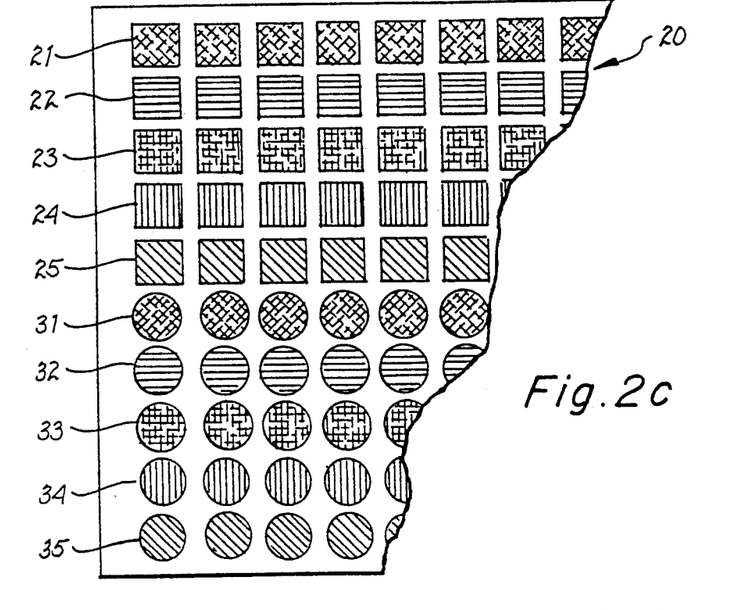
FIG. 2C is sheet of adhesive backed sector-color-coded appliques of the present invention.

FIG. 2C shows a sheet of adhesive backed appliques 20. Sheet 20 contains a plurality of groups of individual, blank, opaque, adhesive backed appliques 21-25 color-coded according to the predetermined sector-color-code of the keyboard. Each of the appliques in the groups 21-25 are adapted to be removed from the sheet 20 and adhered to the top of a key 81 on the keyboard 70 (FIG. 5) to cover the key symbol. Sheet 20 contains enough appliques so that there is at least one group of appliques for each sector in the keyboard 70 and at least one individual applique for each key in each sector 71-80 of FIG. 5. Sheet 20 contains also a plurality of individual, blank, adhesive backed appliques 31-35 ("finger dots") each of which may be removably applied to the top of a finger of the user's hand as shown in FIGS. 2A and 2B. There is at least one individual applique for each finger of each hand. As an alternative to the finger dots, the student may substitute washable color markers according to the sector color code defined herein.

FIG. 2A shows the left hand 40 of the user and FIG. 2B shows the right hand 41. Applied to the fingers of the left hand 40 are adhesive appliques colored orange 31, blue 32, yellow 33 and red 34 applied, respectively, to the little, ring, center and index fingers of the left hand. Applied to the right hand 41 are the appliques green 35, yellow 33, blue 32 and orange 31 applied, respectively, to the index, center, ring and little finger. The finger dots enable the student to learn the finger-color-sector-correlation of this typing method to add to the learning from the first card set of the symbol-color correlation. In the case of pre-school children, the student will have learned the symbol-color-finger-sector correlation before he even gets his first keyboard and his first keyboard will have the keys covered with colored dots. For toddlers learning finger placement becomes incidental to learning their colors and alphabet.

The sheet 20 also contains a group of appliques 18 which have a roughened surface. These appliques are applied in the first instance to the letters "d" and "k" which are home positions for the center fingers of each hand. (FIGS. 5, 6) The roughened surfaces enable the student to locate the home keys by tactile feel. Additional keys specified for tactile feel appliques are secondarily the letters "b" and "y" representing the keys of furthest stretch of the index finger of each hand and the shift keys (not shown) on either side of the keyboard representing the stretch position of the little fingers of each hand.

Figure 3A:
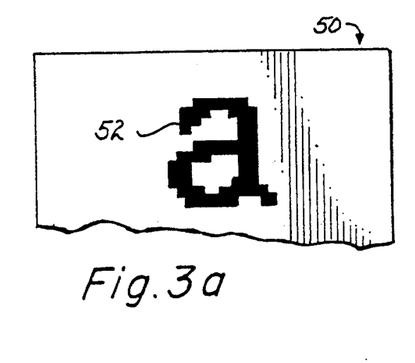
FIGS. 3A and 3B are plan views of each side of one card in the second set of flash cards of the present invention showing the left half of the keyboard.
Figure 3B:
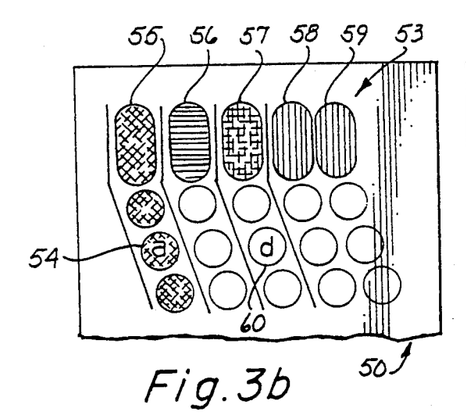

FIGS. 3 and 4, respectively, show cards 50 and 51 from the second set of flash cards of the present invention. FIGS. 3A and 3B are the card 50 for the symbol "a" 52. As in the first card set, each card 50, 51 of the second set has on one side a symbol in a form which is in a uniform style for the entire set. In FIG. 3A it is a black lower case "a" 52. On the other side of the card 50 of FIG. 3B is an image 53 of that half of the predetermined sector-color-coded keyboard which contains the same symbol, in this case the symbol "a" 54, with all of the keys blanked other than at least the one key bearing the symbol "a" 54. In FIG. 3B the left half 53 of the keyboard 70 (FIG. 6) is shown. The sector 55 in which "a" is located is colored orange to give emphasis to the sector-color in which "a" 54 is located. Each key position in that sector is also colored orange. The other sector-colors are respectively colored only at the top of the columns blue 56, yellow 57, red 58 and red 59. The home position letter "d" 60 is shown in black to assist the student in learning the identification of the tactile feel keys at the same time. The sector-colored partial keyboard image with symbol of the second card set enables the student to learn the symbol-sector-color-key position to add to the learning of the correlation of the first card set and the finger dots. In the case of the pre-school children, the entire set of symbol-color-finger-sector-key position correlations is learned even while learning the alphabet and numbers and before he even gets his first keyboard. The "hunt and peck" system is never learned by the student. This bad habit need never be unlearned.

Figure 4A:
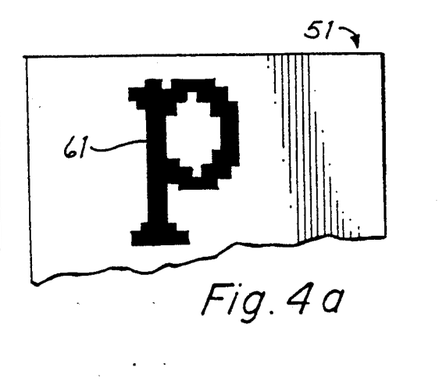
FIGS. 4A and 4B are elevation views of a second card of the second set of flash cards of the present invention showing the right half of the keyboard.
Figure 4B:
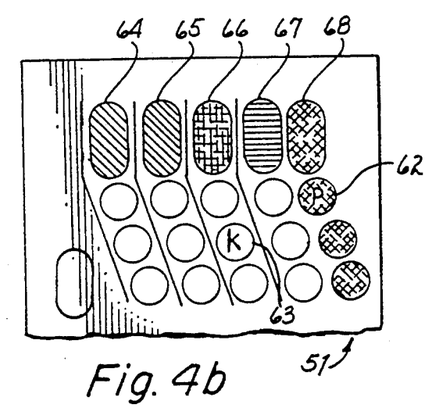

FIG. 4A shows the letter "p" 61 on one side of a card 51, and, on the other side is shown the right half of the predetermined sector-color-coded keyboard 70 which contains the symbol "p" 62 with all of the keys blank other than at least the one bearing the symbol "p" 62 and the tactile feel key "k" 63 in sector 66. The sector 68 in which "p" appears is colored orange in the column at the top, as is each key position in that sector. The other columns are colored in their respective color code only at the top of the columns as follows, green 64, green 65, yellow 66, and blue 67. By coloring the upper portion of the column and all keys therein for the sector in which the letter on the one side, in this case "p", is shown, the student is reinforced in learning the color, sector and position of the symbol and at the same time refreshing his learning of the color of the adjacent sectors.

Figure 9A:
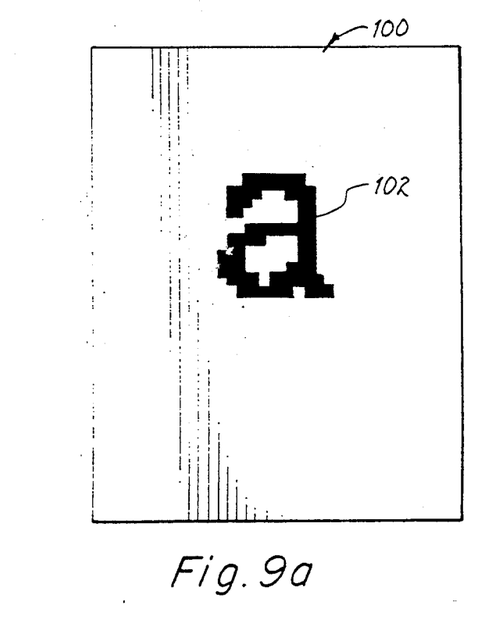
FIGS. 9A and 9B are plan views of each side of one card in the third set of flash cards of the present invention showing the left hand and left half of the keyboard.
Figure 9B:
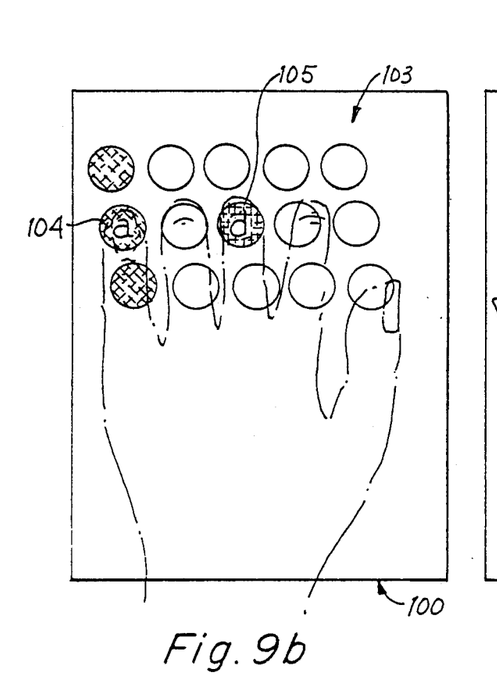

FIGS. 9 And 10, respectively, show cards 100 and 101 from a third set of flash cards of the present invention which is a variation of the second set shown in FIGS. 3-4. FIGS. 9A and 9B are the card 100 for the symbol "a" 102. As in the second card set, each card 100, 101 of the second set has on one side a symbol in a form which is in a uniform style for the entire set. In FIG. 9A it is a black lower case "a" 102. On the other side 103 of the card 100 of FIG. 9B is an image 103 of that half of the predetermined sector-color-coded keyboard which contains the same symbol, in this case the symbol "a" 104, with all of the keys blanked other than at least the one key bearing the symbol "a" 104. Superimposed over the keyboard image is a line drawing or image of the profile of a hand showing the finger used with that symbol and the other fingers aligned with their respective sectors. This card teaches the student graphically which finger to use with the symbol and conditions him to use that finger with the other two keys in the same sector and the fingers to be used in the other sectors. In FIG. 9B the left half 103 of the keyboard 70 (FIG. 6) is shown. The key appliques in the sector in which "a" is located are colored orange to give emphasis to the sector-color in which "a" 104 is located. The other sector-colors are optionally left uncolored. The home position letter "d" 105 is shown in black to assist the student in learning the identification of the tactile feel keys at the same time.

Figure 10A:
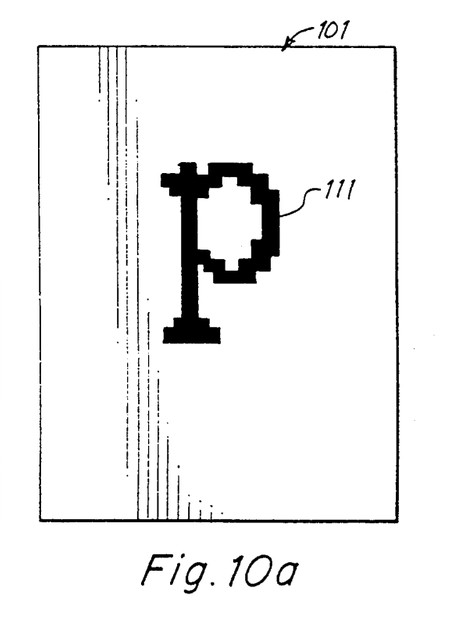
FIGS. 10A and 10B are plan views of each side of one card in the third set of flash cards showing the right hand and right half of the keyboard.
Figure 10B:
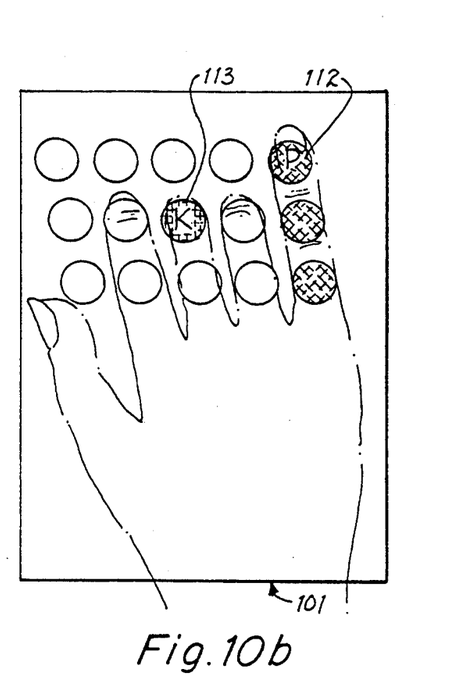

FIG. 10A shows the letter "p" 111 on one side of a card 101, and, on the other side is shown the right half of the predetermined sector-color-coded keyboard 70 which contains the symbol "p" 112 with all of the keys blank other than at least the one bearing the symbol "p" 112 and the tactile feel key "k" 113. All of the key appliques in which "p" appears are colored orange. The other columns are optionally left uncolored.

The "flash cards" could be constructed of any material or be in the form of a software or mechanically driven game. The important thing is the consistent use of specified colors with respect to specified letters of the alphabet, i.e. the color-symbol correlations.

Figure 5:
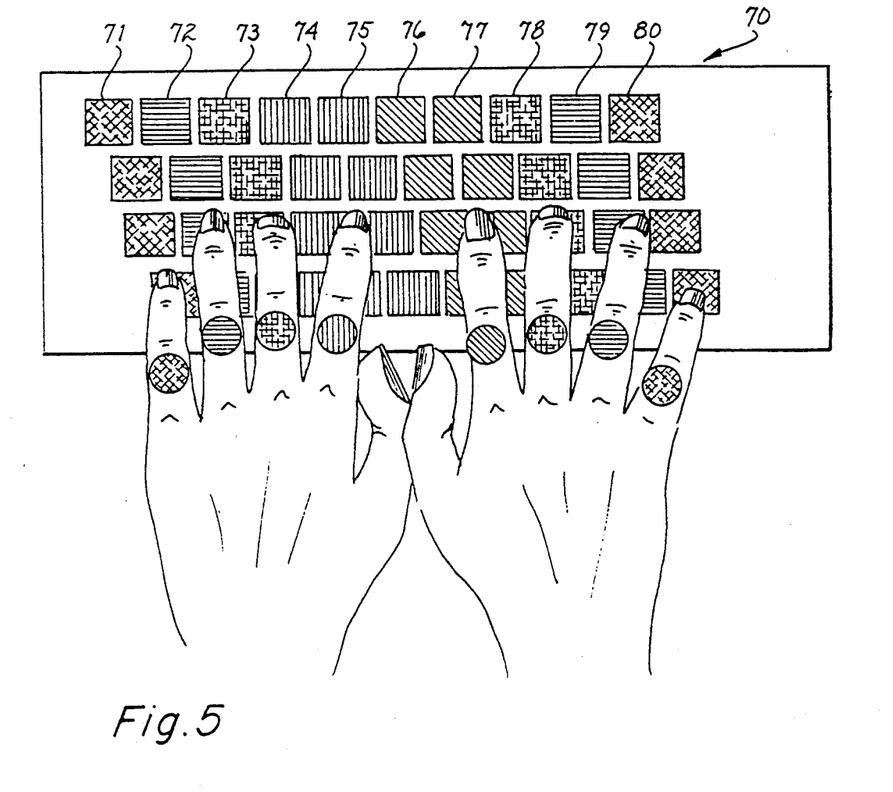
FIG. 5 is a plan view of the blank, sector-color-coded keyboard of the present invention.

FIG. 5 shows the sector-color-coded keyboard 70 to which has been applied the sector-color-coded blank, opaque discs shown in FIG. 2C. The sector codes in order are by column: numeral 1 orange 71, numeral 2 blue 72, numeral 3 yellow 73, numeral 4 red 74, numeral 5 red 75, numeral 6 green 76, numeral 7 green 77, numeral 8 yellow 78, numeral 9 blue 79 and numeral 0 orange 80. The tactile feel keys of keyboard 70 shown in FIG. 5 have been previously identified above.

Because the keyboard has been blanked out by smooth opaque discs (except for the tactile feel keys which have a rough surface for ready identification by feel), the student cannot identify a key by looking down at the keyboard. Therefore, the student is forced to "look-away" from the keyboard to the remotely located "look-away" keyboard image 90 (FIG. 6) while actually typing if he forgets a key sector-color-key position correlation. The purpose of the look-away image of the keyboard 90 is to force the student to rely on memory skills, and then the subconscious "muscle-memory" and feel to locate the proper key in its position in the correct sector without looking down. This speeds the learning process and ultimately increases the speed capability of the student once the keyboard is mastered. These learning skills are reinforced by the visual cues provided by the remote keyboard image. Thus, the student learns to type without looking at the keyboard. Again, the hunt and peck method is never learned and need not be unlearned. Learning typing using the method of the present invention is easy and fun.

FIG. 6 shows the sector-color-coded keyboard display image 90 which is an image of the keyboard having the color-code for sectors 90-100 previously described.

The remote image display 90 may be created in a number of ways. For example, image 90 may be a placard, a photograph, a chart, an electronic display, a reflected image as from a mirror or a projected image such as through a prism. Other techniques are also possible. For example, it may be possible to obtain the look-away image by optical means or by observing the actual keyboard and hands which a TV camera. The use of an interactive software program to create an electronic display is also well known.

Figure 7:
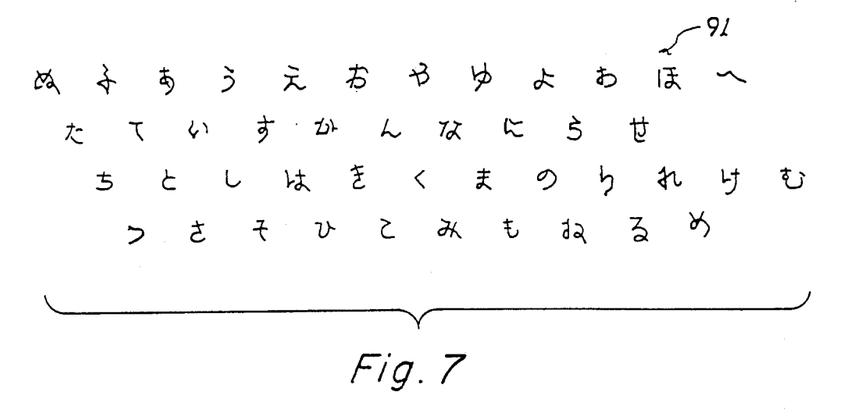
FIGS. 7 and 8 are plan views of a schematic of the keyboard of the present invention substituting Japanese hiragana and katakana symbols, respectively.
Figure 8:
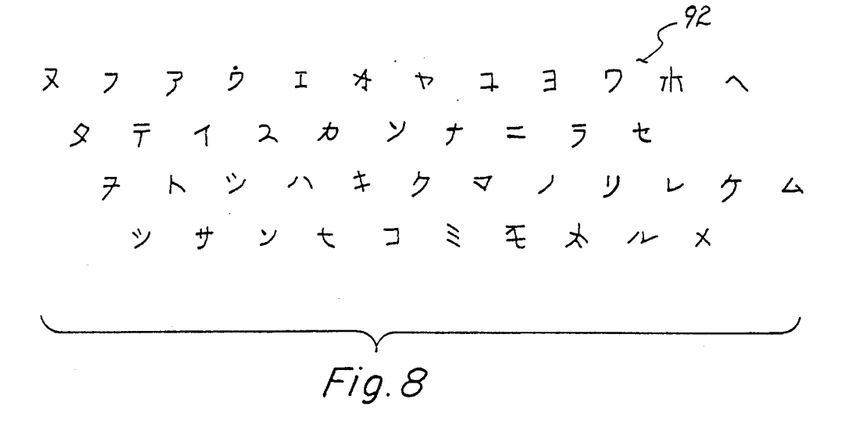

FIG. 7 shows a remote display image 91 of a color-coded keyboard in hiragana symbols and FIG. 8 shows a similar remote image 92 in katakana symbols.

In the description above the primary emphasis has been in disclosing the methodology of the invention as applied to a typing method employed on a typing "keyboard." However, the invention has application beyond the conventional typing keyboard. For example, the "keyboard" employed with the present invention may vary from the standard flat typewriter QWERTY keyboard layout to a finger-actuated, inputting device comprising a molded grip-like device with holes for fingers to be inserted, each finger being surrounded by sensors. Additionally, the inputting device of the present invention may be the buttons on the throttle and stick of a modern fighter plane. Moreover, the present flat keyboards could be laid out in a number of different configurations such as "standard" QWERTY, Dvorak, Hiragana, Katagana or any other system that uses finger position to activate sensors for the transference of one's thoughts through the use of words, letters, symbols, or symbols for sounds to a machine, electronic or mechanical. A good example of another style inputting device which is currently in wide use and to which the present sector-color coded teaching method is applicable is a court reporter's stenowriter machine. In the case of the stenowriter the addition of purple and brown for the left and right thumbs is needed because of the separate assignments for the two thumbs when using that system. The present invention is not limited to keyboards per se but includes many other types of input devices. The present invention broadly contemplates the use of flash cards, color coding, colored finger appliques and "look-away" placards used in conjunction wit finger operated inputting devices in learning how to operate them.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A color-coded data input operating system for instructing users comprising:
   a sector-color-coded data input device having a plurality of keys wherein each of said keys is associated with at least one key symbol and each of said key symbols is covered with a removable colored applique whose color correlates with a predetermined color code which divides the plurality of keys into sectors;
   a look-away reproduction of the sector-color-coded data input device wherein the key symbols are visible; and
   a set of color coded flashcards comprising a card for each key symbol which corresponds to the predetermined sector-color-code of the plurality of keys of the input device wherein each set of cards comprises a facsimile of a portion of the sector-color-coded data input device which contains the key symbol associated with the card.

2. The color-coded data input operating system set forth in claim 1 wherein said sector-color-coded data input device is a conventional typing keyboard.

3. The color-coded data input operating system set forth in claim 2 wherein the removable colored appliques for at least one key symbol has a roughened surface to identify the key associated with said at least one key symbol as a tactile feel key.

4. The color-coded data input operating system set forth in claim 3 wherein said at least one key symbol is identified as a tactile feel key on those cards which include the facsimile of an area of the keyboard which contains the at least one key symbol.

5. The color-coded data input operating system set forth in claim 3 wherein said at least one key symbol on the look away reproduction is identified as a tactile feel key.

6. The color-coded data input operating system set forth in claim 3 wherein said at least one key symbol comprises key symbols "d" and "k" of said conventional typing keyboard.

7. The color-coded data input operating system set forth in claim 6 wherein the key symbols "d" and "k" are identified as tactile feel keys on those cards which include an area of the keyboard which includes the keys for the key symbols "d" and "k".

8. The color-coded data input operating system set forth in claim 6 wherein the key symbols "d" and "d" on the look-away reproduction are identified as tactile feel keys.

9. The color-coded data input operating system set forth in claim 1 wherein said look-away reproduction of the data input device may be reduced or enlarged in order to facilitate visibility by at least one of the users or all of the users, respectively.

10. The color-coded data input operating system set forth in claim 1 wherein said look-away reproduction of the data input device is a chart.

11. A method of learning operations on a color-coded data input device comprising the steps of:
providing a student with a sector-color-coded data input device having a plurality of keys wherein each of said keys is associated with at least one key symbol and each of said key symbols is covered with a removable colored applique whose color correlates with a predetermined color code which divides the plurality of keys into sectors, and a set of color-coded flash cards comprising a card for each key symbol which corresponds to the predetermined sector-color-code of the plurality of keys of the input device wherein each of said cards comprises a facsimile of a portion of the sector-color-coded data input device which contains the key symbol associated with the card; and
flashing the set of cards so that the student views the cards one at a time in order to learn where the key symbols are located on the sector-color-coded data input device.

12. The method of learning operations on a color-coded data input device as set forth in claim 11 wherein each of said cards further comprises a visual representation of the key symbol associated with the card, said visual representation of the key symbol being located on a key which corresponds to the key symbol.

13. The method of learning operations on a color-coded data input device as set forth in claim 12 wherein each of said cards further comprises an image of an operator's hand showing a finger correlated with the key symbol associated with the card.

14. The method of learning operations on a color-coded data input device as set forth in claim 13 further comprising the steps of:
providing a look-away reproduction of the sector-color-coded data input device wherein the key symbols are visible; and
inputting on said sector-color-coded data input device while simultaneously looking at the look-away reproduction of the sector-color-coded data input device.

15. The method of learning operations on a color-coded data input device as set forth in claim 14 further comprising the steps of:
providing a set for color-coded adhesive backed appliques comprising individual colored appliques which correspond to the colors of the sector-color-coded data input device; and
removably adhering at least one of the individual colored appliques to a top of a finger on the operator's hand such that the color applique on the finger corresponds to the sector-color-coded input device.

16. The method of learning operations on a color-coded data input device as set forth in claim 15 further comprising the step of color coding the data input device in colors comprising orange, blue, yellow, red, and green.

17. The method of learning operations on a color-coded data input device set forth in claim 14 wherein the operations are touch typing and the data input device is a keyboard, further comprising the step of:
sector coding the keyboard in columns comprising:

| | |
|---|---|
| the numeral 1 column: | orange |
| the numeral 2 column: | blue |
| the numeral 3 column: | yellow |
| the numeral 4 column: | red |
| the numeral 5 column: | red |
| the numeral 6 column: | green |
| the numeral 7 column: | green |
| the numeral 8 column: | yellow |
| the numeral 9 column: | blue |
| the numeral 0 column: | orange. |

18. The method of learning operations on a color-coded data input device set forth in claim 15 wherein the operations are touch typing and the data input device is a keyboard, further comprising the step of:
sector coding the keyboard in columns comprising:

| | |
|---|---|
| the numeral 1 column: | orange |
| the numeral 2 column: | blue |
| the numeral 3 column: | yellow |
| the numeral 4 column: | red |
| the numeral 5 column: | red |
| the numeral 6 column: | green |
| the numeral 7 column: | green |
| the numeral 8 column: | yellow |
| the numeral 9 column: | blue |
| the numeral 0 column: | orange. |

19. A set of flash cards for teaching operations on a sector-color-coded input device having a predetermined sector-color-code and a plurality of keys wherein each key corresponds to at least one key symbol and each at least one key symbol is associated with a color, said set of flash cards comprising a card for each key symbol on the sector-color-coded input device, each of said cards having front and back sides wherein said front side comprises a reproduction of the key symbol in a form which is uniform for the entire set and said back side comprises a reproduction of at least one of a right half and a left half of the sector-color-coded unit which contains the key symbol indicated on the front side of the card.

20. The set of flash cards set forth in claim 19 wherein the back side of each of said cards further comprises a visual representation of the key symbol identified on the front side of the card, said visual representation of the key symbol being located on a key which corresponds to the key symbol.

21. The set of flash cards set forth in claim 20 wherein said key depicting said visual representation of said key symbol is colored to correlate with the sector-color-coded input device.

22. The set of flash cards set forth in claim 21 wherein the teaching operation is touch typing and the sector-color-coded input device is a conventional keyboard.

23. The set of flash cards as set forth in claims 19, 20, 21, or 22 wherein said back side of each of said cards further comprises an image of an operator's hand showing a finger correlated with the key symbol identified on the front side of the card.

* * * * *